United States Patent
Tabata et al.

(10) Patent No.: US 8,449,964 B2
(45) Date of Patent: May 28, 2013

(54) OPTICAL RECORDING MEDIUM AND MANUFACTURING METHOD THEREOF

(75) Inventors: Hiroshi Tabata, Miyagi (JP); Yousuke Fujii, Miyagi (JP); Yutaka Wada, Miyagi (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 13/114,386

(22) Filed: May 24, 2011

(65) Prior Publication Data

US 2011/0293964 A1 Dec. 1, 2011

(30) Foreign Application Priority Data

May 31, 2010 (JP) ................................. 2010-124937

(51) Int. Cl.
*G11B 7/24* (2006.01)

(52) U.S. Cl.
USPC .... 428/64.1; 428/64.4; 428/64.6; 430/240.13

(58) Field of Classification Search
USPC ............................ 428/64.4, 64.6; 430/270.13
See application file for complete search history.

(56) References Cited

U.S. PATENT DOCUMENTS

| | | | |
|---|---|---|---|
| 6,938,267 B2 | 8/2005 | Kikuchi et al. | |
| 7,846,525 B2 * | 12/2010 | Tsuchino et al. | 428/64.1 |
| 8,133,565 B2 * | 3/2012 | Kiyono et al. | 428/64.1 |
| 2009/0268579 A1 * | 10/2009 | Miyawaki et al. | 369/100 |
| 2010/0187099 A1 | 7/2010 | Wada | |

FOREIGN PATENT DOCUMENTS

| | | |
|---|---|---|
| JP | 2003-059106 | 2/2003 |
| JP | 2009-129526 | 6/2009 |

* cited by examiner

*Primary Examiner* — Elizabeth Mulvaney
(74) *Attorney, Agent, or Firm* — Dentons US LLP

(57) ABSTRACT

An optical recording medium includes: an inorganic recording layer; and a protective layer including a composite oxide containing an indium oxide provided on at least one surface of the inorganic recording layer, wherein the composite oxide is represented by the formula $[(In_2O_3)_{1-X}(A)_X]$, wherein A is cerium oxide or gallium oxide and X satisfies a range of $0.15 \leq X \leq 0.75$.

7 Claims, 2 Drawing Sheets

OPTICAL RECORDING MEDIUM AND MANUFACTURING METHOD THEREOF

BACKGROUND OF THE INVENTION

1. Field of the Invention

The present invention relates to an optical recording medium and a manufacturing method thereof, and specifically, to an optical recording medium having an inorganic recording layer.

2. Background Art

In the past, CDs (Compact Discs), DVDs (Digital Versatile Discs), and the like have led the optical recording media market. However, recently, with the higher definition of televisions and the exponential increase of data handled in PCs (Personal Computers), higher capacity optical recording media have been demanded. In response to the demand, high-capacity optical recording media such as BDs (Blu-ray Discs (registered trademark)) for blue laser have appeared and a new market of high-capacity optical recording media has been created.

As recordable optical recording media, there are rewritable optical recording media represented by DVD-R (Digital Versatile Disc-Recordable) and DVD±RW (Digital Versatile Disc±ReWritable), and recordable optical recording media represented by CD-R (Compact Disc-Recordable) and, DVD-R (Digital Versatile Disc-Recordable), and particularly, the latter has greatly contributed to the market growth as low-price media. Therefore, it is conceivable that the price reduction of the recordable optical recording media is also necessary for market growth in high-capacity optical recording media for blue laser.

In the recordable optical recording media, both inorganic materials and organic dye materials are approved as recording materials according to the standards. The recordable optical recording media using organic materials have an advantage that they can be manufactured at low cost by a spin coating method, and, on the other hand, the recordable optical recording media using inorganic materials have an advantage in reproduction durability and good push-pull signal characteristics, but have a disadvantage in necessity of a large-scaled sputtering system. Therefore, in order that the recordable optical recording media using inorganic materials become competitive with those using organic materials in terms of price, it is absolutely necessary to suppress the initial investment of manufacturing equipment and efficiently produce recording media by improving takt time per disc.

As the most effective means for solving the problem, the initial investment for a sputtering system may be suppressed the manufacturing takt time may be shortened by reducing the number of layer forming a recording film and the number of deposition chambers may be reduced. However, even when the number of layers is simply reduced, if a material having a large thickness and a slow deposition rate is used, the manufacturing takt time may increase and the cost rise may be caused instead.

In related art, as a material for a protective layer of the recordable optical recording media using inorganic materials, a transparent dielectric material such as SiN or ZnS—$SiO_2$ is mainly used (for example, see Patent Document 1: JP-A-2003-59106). However, SiN and ZnS—SiO2 have advantages in higher deposition rate and good productivity, but have a problem in poor storage characteristics (storage reliability). Of the dielectric materials other than those mentioned above, some have high storage reliability, however, these materials have problems that the deposition rate is very low and the productivity is poor because radiofrequency (RF) sputtering is necessary. Therefore, it is difficult to achieve a balance between storage reliability and productivity.

In order to solve the problem, a technology using an indium oxide and a tin oxide (hereinafter, referred to as ITO) that can be DC-sputtered as a protective layer has been proposed (for example, see Patent Document 2: JP-A-2009-129526). In this technology, high storage reliability may be realized in the recordable optical recording media and high productivity may be obtained by reducing the number of deposition chambers at the same time. That is, using ITO for the protective layer, the high deposition rate may be obtained and the protective layer may be thicker by only one chamber, and, as a result, the number of chambers may be reduced while the degree of freedom of design is kept.

SUMMARY OF THE INVENTION

However, if ITO is used for the protective layer, nodules may readily be formed on the target surface as the use of the ITO target goes on. The nodules are minute projections that appear on the target surface with the lapse of sputtering time, and considered as sputtering residues originating from high-resistance materials. As the precipitation of the nodules further progress, breakdown occurs around them and they become powdery and adhere to shields and discs. For example, when the powder adheres to a disc, guide grooves for reproduction laser are lost in the part with the powder, and a disc failure as a tracking servo failure is caused. When the disc failure increases, it is necessary to stop the production and remove the nodules on the target surface, and that causes lower capacity utilization, i.e., lower productivity.

Therefore, it is desirable to provide a recordable optical recording medium and a manufacturing method thereof advantageous in storage reliability and further advantageous in productivity than in the case of using an indium oxide and a tin oxide as a material for a protective layer.

As a result of a diligent study, the inventors have found and experimentally verified that good recording characteristics and high storage reliability can be realized and high nodule resistance can be obtained using a material including an indium oxide and a cerium oxide (Indium Cerium Oxide, hereinafter, referred to as ICO) or an indium oxide and a gallium oxide (Indium Gallium Oxide, hereinafter, referred to as IGO) as a material of a protective layer, and worked out embodiments of the invention.

According to an embodiment of the invention, an optical recording medium includes an inorganic recording layer, and a protective layer including a composite oxide containing an indium oxide and provided on at least one surface of the inorganic recording layer, wherein the composite oxide is represented by the formula: $[(In_2O_3)_{1-X}(A)_X]$, wherein A is cerium oxide or gallium oxide and X satisfies a range of $0.15 \leq X \leq 0.75$.

According to another embodiment of the invention, a manufacturing method of an optical recording medium includes the steps of forming an inorganic recording layer, and forming a protective layer including a composite oxide containing an indium oxide on at least one surface of the inorganic recording layer, wherein the composite oxide is represented by the formula: $[(In_2O_3)_{1-X}(A)_X]$, wherein A is cerium oxide or gallium oxide and X satisfies a range of $0.15 \leq X \leq 0.75$.

In the embodiments of the invention, since the protective layer including an indium oxide and a cerium oxide or an indium oxide and a gallium oxide is provided at least on one surface of the inorganic recording layer, advantageous storage reliability may be obtained. Further, regarding the material including an indium oxide and a cerium oxide or an indium oxide and a gallium oxide, deposition by the direct-current (DC) sputtering method can be performed because of its high conductivity, high productivity equal to that of an ITO material may be maintained because of its high deposition rate, and capacity utilization may be improved with no generation of nodules.

As described above, according to the embodiments of the invention, a balance between storage reliability and high productivity may be achieved.

DESCRIPTION OF PREFERRED INVENTION

As below, an embodiment of the invention will be explained with reference to the drawings.
<Configuration of Recordable Optical Recording Medium>

Figure 1:
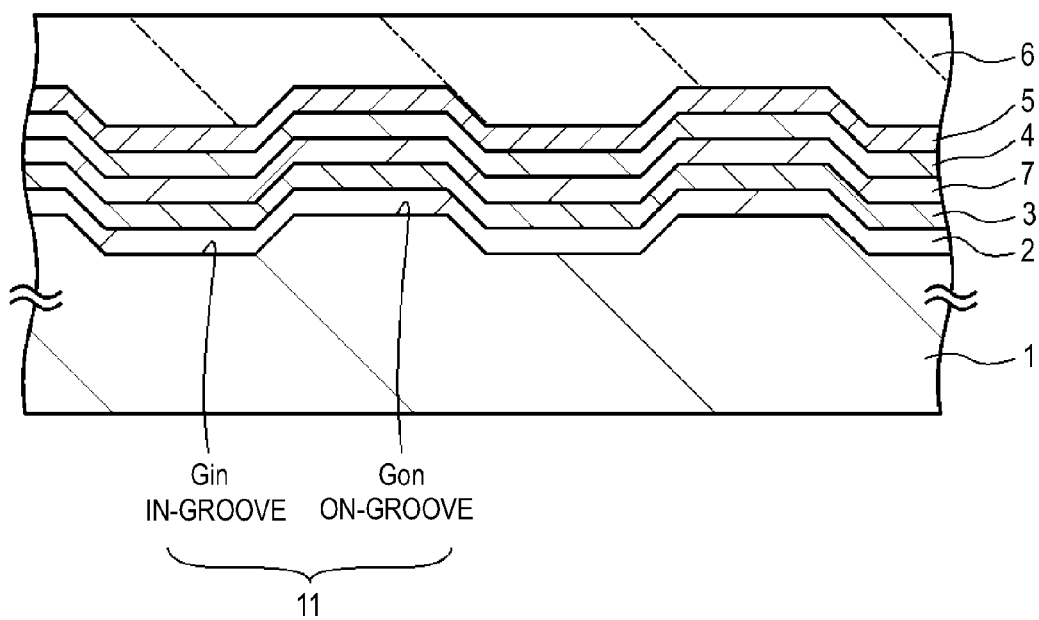
FIG. 1 is a schematic sectional view showing one configuration example of a recordable optical recording medium according to one embodiment of the invention.

FIG. 1 is a schematic sectional view showing one configuration example of a recordable optical recording medium according to one embodiment of the invention. The recordable optical recording medium 10 has a configuration in which a reflection layer 2, a first protective layer 3, a heat accumulation layer 7, an inorganic recording layer 4, a second protective layer 5, and a light transmission layer 6 are sequentially stacked on a substrate 1.

In the recordable optical recording medium 10 according to the one embodiment, information signals are recorded or reproduced by applying a laser beam from the side of the light transmission layer 6 to the inorganic recording layer 4. For example, a laser beam having a wavelength in a range from 400 nm to 410 nm is collected by an objective lens having a numerical aperture in a range from 0.84 to 0.86 and applied from the side of the light transmission layer 6 to the inorganic recording layer 4, and thereby, information signals are recorded or reproduced. As the recordable optical recording medium 10, for example, a BD-R is cited.

The jitter of the recordable optical recording medium 10 is preferably 7.5% or less, and more preferably 7.0% or less. When the jitter is set to 7.50 or less, a sufficiently good error rate may be realized and good information signal characteristics may be obtained. The symbol error rate (SER) of the recordable optical recording medium 10 is preferably $2.0 \times 10^{-3}$ or less, more preferably $1.0 \times 10^{-3}$ or less, and further preferably $3.0 \times 10^{-4}$ or less. When the SER is $2.0 \times 10^{-3}$ or less, errors are generally correctable and good information signal characteristics may be obtained.

As below, the substrate 1, the reflection layer 2, the first protective layer 3, the heat accumulation layer 7, the inorganic recording layer 4, the second protective layer 5, and the light transmission layer 6 which form the recordable optical recording medium 10 will sequentially be explained.
(Substrate)

The substrate 1 has an annular shape with an opening at its center (hereinafter, referred to as "center hole"), for example. One principal surface of the substrate 1 is a concavo-convex surface 11, for example, and the inorganic recording layer 4 is deposited on the concavo-convex surface 11. Hereinafter, the concave part of the concavo-convex surface 11 will be referred to as "in-groove Gin" and the convex part will be referred to as "on-groove Gon".

As the shapes of the in-groove Gin and the on-groove Gon, various shapes such as a spiral shape and a concentric ring shape are cited, for example. Further, the in-groove Gin and/or the on-groove Gon are wobbled for addition of address information, for example.

The diameter of the substrate 1 is selected to be 120 mm, for example. The thickness of the substrate 1 is selected in consideration of rigidity, preferably from 0.3 mm to 1.3 mm, more preferably from 0.6 mm to 1.3 mm, and selected to be 1.1 m, for example. Further, the diameter of the center hole is selected to be 15 mm, for example.

As a material for the substrate 1, for example, a plastic material or glass may be used, and, in view of cost, the plastic material is preferably used. As the plastic material, for example, a polycarbonate resin, a polyolefin resin, an acrylic resin, or the like may be used.
(Reflection Layer)

As a material of the reflection layer 2, a metal or a semi-metal that can be used generally in optical discs known in related art such as an Ag alloy or an Al alloy, for example, may be selected and used arbitrarily according to the characteristics desired for the reflection layer 2. Further, as the material of the reflection layer 2, it is desirable to use a material having heat sink (radiator) capability in addition to reflection capability of light. In this manner, a function as a radiator layer may be provided to the reflection layer 2.
(First Protective Layer, Second Protective Layer)

The first protective layer 3 and the second protective layer 5 protect the inorganic recording layer 4 and control the optical characteristics and thermal characteristics at recording/reproduction. At least one of the first protective layer 3 and the second protective layer 5 includes a composite oxide containing an indium oxide. The composite oxide includes an oxide of indium and cerium (ICO) or an oxide of indium and gallium (IGO). Using the constitution, a balance between storage reliability and high productivity may be achieved. Specifically, it is preferable that both the first protective layer 3 and the second protective layer 5 include ICO or IGO. As materials other than ICO and IGO, dielectric materials of oxides, nitrides, and carbides that can be used generally in optical discs known in related art such as SiN, ZnS—$SiO_2$, $Ta_2O_5$ may be used. Further, transparent oxides such as an indium oxide and a tin oxide (ITO) may be used. The thickness of the first protective layer 3 is preferably from 10 nm to 40 nm, and more preferably from 20 nm to 30 nm in order that appropriate reflectivity may be obtained. The thickness of the second protective layer 5 is preferably from 11 nm to 34 nm, and more preferably from 16 nm to 30 nm in view of improvement in recording power margin.

It may be possible to provide at least one of the first protective layer 3 and the second protective layer 5, however, in view of obtainment of good information signal characteristics and storage reliability characteristics, it is preferable to provide both the first protective layer 3 and the second protective layer 5 as shown in FIG. 1.

The composite oxide has a composition of the following formula:

$$[(In_2O_3)_{1-X}(A)_X]\ldots \qquad (1)$$

wherein A is cerium oxide or gallium oxide, X is preferably $0.15 \leq X \leq 0.75$, more preferably $0.15 \leq X \leq 0.65$, and further preferably $0.15 \leq X \leq 0.40$.

When X satisfies the range of $0.15 \leq X \leq 0.75$, good information signal characteristics and storage reliability characteristics may be obtained and productivity of nodule resistance or the like may be improved.

(Inorganic Recording Layer)

The inorganic recording layer 4 is a recordable inorganic recording layer and includes ZnS, $SiO_2$, and Sb, for example, further contains at least one element selected from the group consisting of Zn, Ga, Te, V, Si, Ta, Ge, In, Cr, Sn, and Tb according to need, and has preferably a composition of the following formula (2):

$$[(ZnS)_x(SiO_2)_{1-x}]_y(Sb_zX_{1-z})_{1-y}\ldots \quad (2)$$

wherein $0<x\leq1.0$, $0.3\leq y\leq0.7$, $0.8<z\leq1.0$, and X is at least one element selected from the group consisting of Ga, Te, V, Si, Zn, Ta, Ge, In, Cr, Sn, and Tb.

Further, it is preferable that the thickness of the inorganic recording layer 4 is from 3 nm to 40 nm in view of obtainment of good recording and reproduction characteristics. In the inorganic recording layer 4 includes ZnS, $SiO_2$, and Sb, the ZnS, $SiO_2$, and Sb take an amorphous state before recording. When a laser beam is applied to the inorganic recording layer 4 in the state, a crystal of Sb is formed in the center part of the inorganic recording layer 4, and other atoms concentrate on the vicinity of the interface. Thereby, the optical constant (n: refractive index, k: attenuation coefficient) changes and information signals are recorded. As described above, it is difficult to change the inorganic recording layer 4 in the state in which the crystal of Sb has been formed in the center part back into the amorphous state before recording, and the inorganic recording layer is used as a recordable inorganic recording layer.

As described above, the inorganic recording layer 4 includes ZnS, $SiO_2$, and Sb and preferably has the composition of the above formula (2), and the recorded information is stored stably over a long period in the initial condition and the signals are not lost by the reproduction laser beam at signal reproduction. Therefore, the quality is not altered in the typical long storage and the write characteristics are kept, sufficient sensitivity and reaction rate are obtained for the recording and/or reproduction laser beam, and thereby, good recording and reproduction characteristics may be obtained over wide ranges of linear velocity and recording power. Further, in view of the further improvement of storage reliability, it is preferable to use the inorganic recording layer 4 includes ZnS, $SiO_2$, and Sb and the first protective layer 3 and the second protective layer 5 includes the composite oxide containing the indium oxide in combination.

The material of the inorganic recording layer 4 is not limited to the above described materials, but inorganic recording materials that can be used generally in recordable optical discs known in related art may be used.

For example, as the inorganic recording layer 4, for example, a phase-change type inorganic recording layer including Te, Pd, and O (oxygen) may be used, and the inorganic recording layer has for example a composition of the following formula (3):

$$(Te_xPd_{1-x})_yO_{1-y}\ldots \quad (3)$$

wherein $0.7\leq x\leq0.9$, $0.3\leq y\leq0.7$.

Furthermore, as the inorganic recording layer 4, for example, an inorganic recording layer of alloy type formed by stacking a silicon (Si) film and a copper (Cu) alloy film, or an inorganic recording layer mainly including Ge, Bi, and N may be used.

(Heat Accumulation Layer)

The heat accumulation layer 7 has a coefficient of thermal conductivity lower than that of the first protective layer 3, and includes a dielectric material such as $ZnS-SiO_2$, for example. As shown in FIG. 1, in the case where the heat accumulation layer 7 is provided between the first protective layer 3 and the inorganic recording layer 4, the recording and/or reproduction laser beam is applied to the inorganic recording layer 4 from the opposite side to the heat accumulation layer 7. The heat accumulation layer 7 functions as a heat accumulation layer that accumulates the heat generated at recording within the inorganic recording layer 4. Therefore, by providing the heat accumulation layer 7 between the first protective layer 3 and the inorganic recording layer 4, the heat may efficiently be used and the recording sensitivity of the recordable optical recording medium 10 may be made higher. Further, heat is once accumulated within the inorganic recording layer 4, then, the heat is released from inside of the inorganic recording layer 4 to the first protective layer 3 and the reflection layer 2 which have high coefficients of thermal conductivity, and thus, more correct mark edges may be formed and low jitter and a wide power margin may be obtained. Note that, if the heat accumulation layer 7 is too thick and $dh/(d1+dh)>0.95$ (where d1: thickness of first protective layer, dh: thickness of heat accumulation layer), too much heat stays within the inorganic recording layer 4, and the mark edges tend to vary and the power margin tend to be narrower. Thus, it is preferable that $dh/(d1+dh)\leq0.95$ is satisfied. As a deposition method of the heat accumulation layer 7, for example, a sputtering method may be used.

Note that the position in which the heat accumulation layer is provided is not limited to the position between the first protective layer 3 and the inorganic recording layer 4, but, for example, the heat accumulation layer 7 may be provided between the inorganic recording layer 4 and the second protective layer 5. In the case of the configuration, the recording and/or reproduction laser beam is applied from the side of the heat accumulation layer 7 to the inorganic recording layer 4. Further, the heat accumulation layer 7 may be provided in both positions between the first protective layer 3 and the inorganic recording layer 4 and between the inorganic recording layer 4 and the second protective layer 5.

(Light Transmission Layer)

The light transmission layer 6 includes a light transmission sheet having an annular shape and a bonding layer for bonding the light transmission sheet to the substrate 1, for example. It is preferable that the light transmission sheet is made of a material having low absorption capability with respect to the laser beam used for recording and/or reproduction, and specifically, made of a material having transmittance of 90% or more. As a material of the light transmission sheet, for example, a polycarbonate resin material or polyolefin resin (e.g., ZEONEX (registered trademark)) is cited. The thickness of the light transmission sheet is preferably selected to be 0.3 mm or less, and more preferably selected within a range from 3 μm to 177 μm. The bonding layer is made of an ultraviolet curable resin or a pressure sensitive adhesive (PSA), for example. Further, the light transmission layer 6 may be formed using a resin cover obtained by curing a photosensitive resin such as a UV resin. As a material of the resin cover, for example, an ultraviolet curable acrylic resin is cited.

The thickness of the light transmission layer 6 is preferably selected within the range from 10 μm to 177 μm, and, for example, selected to be 100 μm. High-density recording may be realized by combining the thin light transmission layer 6 and an objective lens having a high NA (numerical aperture) of about 0.85, for example.

<Manufacturing Method of Recordable Optical Recording Medium>

Next, an example of a manufacturing method of the recordable optical recording medium according to the one embodiment of the invention will be explained.

(Molding Step of Substrate)

First, the substrate 1 with the concavo-convex surface 11 formed on one principal surface is molded. As a method of molding the substrate 1, for example, an injection molding method, a photo polymerization method (2P method), or the like may be used.

(Deposition Step of Reflection Layer)

Next, the substrate 1 is carried into a vacuum chamber in which a target containing, as a main component, an Ag alloy or an Alloy, for example, is provided, and the vacuum chamber is evacuated to predetermined pressure. Then, while a process gas such as an Ar gas is introduced into the vacuum chamber, the target is sputtered and the reflection layer 2 is deposited on the substrate 1.

(Deposition Step of First Protective Layer)

Next, the substrate 1 is carried into a vacuum chamber in which a target containing, as a main component, ICO or IGO, for example, is provided, and the vacuum chamber is evacuated to predetermined pressure. Then, while a process gas such as an Ar gas or an $O_2$ gas is introduced into the vacuum chamber, the target is sputtered and the first protective layer 3 is deposited on the reflection layer 2. As the sputtering method, for example, a radio-frequency (RF) sputtering method or a direct-current (DC) sputtering method may be used, and particularly, the direct-current sputtering method is preferable. This is because the direct-current sputtering method provides a higher deposition rate than that of the radio-frequency sputtering method and the productivity may be improved.

(Deposition Step of Heat Accumulation Layer)

Next, the substrate 1 is carried into a vacuum chamber in which a target containing, as a main component, ZnS and $SiO_2$, for example, is provided, and the vacuum chamber is evacuated to predetermined pressure. Then, while a process gas such as an Ar gas is introduced into the vacuum chamber, the target is sputtered and the heat accumulation layer 7 is deposited on the first protective layer 3.

(Deposition Step of Inorganic Recording Layer)

Next, the substrate 1 is carried into the vacuum chamber in which a target containing, as a main component, ZnS, $SiO_2$, and Sb, for example, is provided, and the vacuum chamber is evacuated to predetermined pressure. Then, while a process gas such as an Ar gas is introduced into the vacuum chamber, the target is sputtered and the inorganic recording layer 4 is deposited on the first protective layer 3.

(Deposition Step of Second Protective Layer)

Next, the substrate 1 is carried into a vacuum chamber in which a target containing, as a main component, ICO or IGO, for example, is provided, and the vacuum chamber is evacuated to predetermined pressure. Then, while a process gas such as an Ar gas or an $O_2$ gas is introduced into the vacuum chamber, the target is sputtered and the second protective layer 5 is deposited on the inorganic recording layer 4. As the sputtering method, for example, a radio-frequency (RF) sputtering method or a direct-current (DC) sputtering method may be used, and particularly, the direct-current sputtering method is preferable. This is because the direct-current sputtering method provides a higher deposition rate than that of the radio-frequency sputtering method and the productivity may be improved.

(Forming Step of Light Transmission Layer)

Next, the light transmission layer 6 is formed on the second protective layer 5. As a forming method of the light transmission layer 6, a resin coating method of forming the light transmission layer 6 by spin-coating a photosensitive resin such as an ultraviolet curable resin (UV resin) on the second protective layer 5 and applying light such as UV light to the photosensitive resin or a sheet bonding method of forming the light transmission layer 6 by bonding the light transmission sheet to the concavo-convex surface 11 side on the substrate 1 using an adhesive may be used. Further, as the sheet bonding method, for example, a sheet resin bonding method of forming the light transmission layer 6 by bonding the light transmission sheet to the concavo-convex surface 11 side on the substrate 1 using a photosensitive resin such as an UV resin applied onto the second protective layer 5, or a sheet PSA bonding method of forming the light transmission layer 6 by bonding the light transmission sheet to the concavo-convex surface 11 side on the substrate 1 using a pressure sensitive adhesive (PSA) uniformly applied on one principal surface of the sheet in advance may be used. Through the above described steps, the recordable optical recording medium 10 shown in FIG. 1 is obtained.

As described above, according to the one embodiment of the invention, the first protective layer 3 and the second protective layer 5 are respectively provided on each side of the inorganic recording layer 4 and at least one of the first protective layer 3 and the second protective layer 5 including ICO or IGO, and high storage reliability may be obtained. Further, using ICO or IGO for the protective layer, the protective layer may be deposited at a high deposition rate. Therefore, the protective layer that can be formed in one chamber may be made thicker and, as a result, the number of chambers may be reduced while the degree of freedom of design is kept. Thereby, the initial investment of manufacturing equipment may significantly be suppressed and the lower price for inorganic media may be realized by the takt time shortening effect at manufacturing. Further, a sufficient recording power margin may be secured for high-speed recording for 6× BD-R or the like.

Furthermore, since the recordable optical recording medium 10 is fabricated by sequentially stacking the reflection layer 2, the first protective layer 3, the heat accumulation layer 7, the inorganic recording layer 4, and the second protective layer 5 on the substrate 1, the recordable optical recording medium 10 having high productivity and storage reliability may be fabricated using a five-chamber deposition machine.

WORKING EXAMPLES

Hereinafter, the invention will specifically be explained using working examples and test examples, however, the invention is not limited to the working examples and the test examples only.

(Evaluation of Signal Characteristics)

In the working examples and comparative examples, ODU-1000 manufactured by Pulstec Industrial was used for recording and reproduction in an information signal evaluation with respect to recordable optical recording media. In the evaluation machine, the wavelength of the laser beam was set to 405 nm, the numerical aperture NA was set to 0.85, and the recordable optical recording media were recorded at the quadruple-speed linear velocity of 19.69 m/s according to the standards of Blu-ray Disc 25 GB density and reproduced at a single speed of 4.92 m/s. Then, jitter was measured using a time interval analyzer TA 720 manufactured by Yokogawa Electric through an equalizer board manufactured by Pulstec Industrial and used as signal evaluations.

(Evaluation of Storage Reliability)

In the working examples and comparative examples, for storage reliability evaluation, a Blue-ray Disc drive (BDR-101A) manufactured by Pioneer was used for recording and reproduction evaluations of information signals and symbol error rates (SER) of the signals recorded in advance were observed at 80° C. and 85% after 600 hours.

(Analysis Method of Layer Compositions)

In the working examples, comparative example, and test examples, the compositions of the respective layers were obtained in the following manner.

First, samples were fabricated by depositing layers (for example, the first or second protective layer) for obtaining their compositions on flat substrates under the same film formation conditions of the following working examples, comparative example, and test examples. Then, the layer compositions were analyzed by an inductively coupled plasma (ICP) mass spectrometry apparatus using an ICP mass spectroscope.

<Studies on Jitter Characteristics and Storage Reliability Characteristics>

Working Example 1

First, a polycarbonate substrate having a thickness of 1.1 mm was molded by injection molding. Note that, on the polycarbonate substrate, a concavo-convex surface having the in-groove Gin and the on-groove Gon was formed.

Then, on the polycarbonate substrate, the reflection layer, the first protective layer, the heat accumulation layer, the inorganic recording layer, and the second protective layer were sequentially stacked by the sputtering method. The specific configurations of the respective layers were as follows.

Reflection layer: Ag alloy, 80 nm
First protective layer: $(In_2O_3)_{80}(Ga_2O_3)_{20}$, 14 nm
Heat accumulation layer: $ZnS—SiO_2$, 7 nm
Inorganic recording layer: $[(ZnS)_{80}(SiO_2)_{20}]_{40}Sb_{60}$, 18 nm
Second protective layer: $(In_2O_3)_{80}(Ga_2O_3)_{20}$, 17 nm Then, by the spin-coating method, an ultraviolet curable resin is uniformly applied onto the second protective layer and ultraviolet light is applied thereto for curing, and thereby, the light transmission layer having a thickness of 0.1 mm is formed. In the above described manner, an intended recordable optical medium was obtained.

From an information signal evaluation of the recordable optical recording medium, the single-speed reproduction jitter in recording at the quadruple-speed linear velocity of 19.68 m/s according to the standards of Blu-ray Disc 25 GB density was 5.4% and good as shown in Table 1. Note that the good upper limit of jitter was set to 7.5%, and it is well known that, if the jitter is less than 7.5%, the jitter has a correlation with a sufficiently good error rate. Further, in a storage reliability evaluation, the symbol error rate (SER) at 80° C. and 85% after 600 hours was $8.0 \times 10^{-5}$ and good as shown in Table 1. Here, the good upper limit of the SER was set to $2.0 \times 10^{-3}$ that is sufficiently correctable. That is, the recordable optical recording medium having the configuration provides good results in information signals and storage reliability.

Working Example 2

A recordable optical recording medium was obtained in the same manner as that of working example 1 except that the first protective layer and the second protective layer were formed using $(In_2O_3)_{60}(Ga_2O_3)_{40}$. Note that the material of the first protective layer and the second protective layer was fabricated by a co-sputtering method using two kinds of targets of $In_2O_3$ and $Ga_2O_3$. From an information signal evaluation and a storage reliability evaluation performed in the same manner as that of working example 1, good results of 6.2% and $2.2 \times 10^{-4}$ as shown in Table 1 were obtained, respectively.

Working Example 3

A recordable optical recording medium was obtained in the same manner as that of working example 1 except that the first protective layer and the second protective layer were formed using $(In_2O_3)_{35}(Ga_2O_3)_{65}$. Note that the material of the first protective layer and the second protective layer was fabricated by the co-sputtering method using two kinds of targets of $In_2O_3$ and $Ga_2O_3$. From an information signal evaluation and a storage reliability evaluation performed in the same manner as that of working example 1, good results of 6.9% and $8.0 \times 10^{-4}$ as shown in Table 1 were obtained, respectively.

Working Example 4

A recordable optical recording medium was obtained in the same manner as that of working example 1 except that the first protective layer and the second protective layer were formed using $(In_2O_3)_{90}(Ga_2O_3)_{10}$. Note that the material of the first protective layer and the second protective layer was fabricated by the co-sputtering method using two kinds of targets of $In_2O_3$ and $Ga_2O_3$. From an information signal evaluation and a storage reliability evaluation performed in the same manner as that of working example 1, good results of 5.7% and $1.5 \times 10^{-4}$ as shown in Table 1 were obtained, respectively.

Working Example 5

A recordable optical recording medium was obtained in the same manner as that of working example 1 except that the first protective layer and the second protective layer were formed using $(In_2O_3)_{85}(CeO_2)_{15}$. From an information signal evaluation and a storage reliability evaluation performed in the same manner as that of working example 1, good results of 5.5% and $8.2 \times 10^{-5}$ as shown in Table 1 were obtained, respectively.

Working Example 6

A recordable optical recording medium was obtained in the same manner as that of working example 1 except that the first protective layer and the second protective layer were formed using $(In_2O_3)_{60}(CeO_2)_{40}$. Note that the material of the first protective layer and the second protective layer was fabricated by the co-sputtering method using two kinds of targets of $In_2O_3$ and $CeO_2$. From an information signal evaluation and a storage reliability evaluation performed in the same manner as that of working example 1, good results of 5.9% and $1.7 \times 10^{-4}$ as shown in Table 1 were obtained, respectively.

Working Example 7

A recordable optical recording medium was obtained in the same manner as that of working example 1 except that the first protective layer and the second protective layer were formed using $(In_2O_3)_{40}(CeO_2)_{60}$. Note that the material of the first protective layer and the second protective layer was fabricated by the co-sputtering method using two kinds of targets of $In_2O_3$ and $CeO_2$. From an information signal evaluation and a storage reliability evaluation performed in the same manner as that of working example 1, good results of 6.6% and $5.7 \times 10^{-4}$ as shown in Table 1 were obtained, respectively.

Working Example 8

A recordable optical recording medium was obtained in the same manner as that of working example 1 except that the first protective layer and the second protective layer were formed using $(In_2O_3)_{20}(CeO_2)_{80}$. Note that the material of the first protective layer and the second protective layer was fabricated by the co-sputtering method using two kinds of targets of $In_2O_3$ and $CeO_2$. From an information signal evaluation and a storage reliability evaluation performed in the same manner as that of working example 1, good results of 7.4% and $1.5 \times 10^{-4}$ as shown in Table 1 were obtained, respectively.

Working Example 9

A recordable optical recording medium was obtained in the same manner as that of working example 1 except that the first protective layer and the second protective layer were formed using $(In_2O_3)_{90}(CeO_2)_{10}$. Note that the material of the first protective layer and the second protective layer was fabricated by the co-sputtering method using two kinds of targets of $In_2O_3$ and $CeO_2$. From an information signal evaluation and a storage reliability evaluation performed in the same manner as that of working example 1, good results of 5.8% and $2.4 \times 10^{-4}$ as shown in Table 1 were obtained, respectively.

Comparative Example 1

A recordable optical recording medium was obtained in the same manner as that of working example 1 except that the first protective layer and the second protective layer were formed using $In_2O_3$. From an information signal evaluation and a storage reliability evaluation performed in the same manner as that of working example 1, a good result of 6.3% was obtained in the information signal evaluation, however, a poor result of $3.0 \times 10^{-3}$ more than $1.0 \times 10^{-3}$ was obtained in the storage reliability evaluation as shown in Table 1.

Comparative Example 2

A recordable optical recording medium was obtained in the same manner as that of working example 1 except that the first protective layer and the second protective layer were formed using $(In_2O_3)_{20}(Ga_2O_3)_{80}$. Note that the material of the first protective layer and the second protective layer was fabricated by the co-sputtering method using two kinds of targets of $In_2O_3$ and $Ga_2O_3$. From an information signal evaluation and a storage reliability evaluation performed in the same manner as that of working example 1, poor results of 7.8% and $3.0 \times 10^{-3}$ as shown in Table 1 were obtained, respectively.

Table 1 shows jitter characteristics and storage reliability characteristics of the recordable optical recording media of working examples 1 to 9 and comparative examples 1 and 2.

TABLE 1

| | First protective layer | Second protective layer | Information signal evaluation: jitter [%] | Storage reliability evaluation: SER |
|---|---|---|---|---|
| Working example 1 | $(In_2O_3)80(Ga_2O_3)20$ | $(In_2O_3)80(Ga_2O_3)20$ | 5.4 | $8.0 \times 10^{-5}$ |
| Working example 2 | $(In_2O_3)60(Ga_2O_3)40$ | $(In_2O_3)60(Ga_2O_3)40$ | 6.2 | $2.2 \times 10^{-4}$ |
| Working example 3 | $(In_2O_3)35(Ga_2O_3)65$ | $(In_2O_3)35(Ga_2O_3)65$ | 6.9 | $8.0 \times 10^{-4}$ |
| Working example 4 | $(In_2O_3)90(Ga_2O_3)10$ | $(In_2O_3)90(Ga_2O_3)10$ | 5.7 | $1.5 \times 10^{-4}$ |
| Working example 5 | $(In_2O_3)85(CeO_2)15$ | $(In_2O_3)85(CeO_2)15$ | 5.5 | $8.2 \times 10^{-5}$ |
| Working example 6 | $(In_2O_3)60(CeO_2)40$ | $(In_2O_3)60(CeO_2)40$ | 5.9 | $1.7 \times 10^{-4}$ |
| Working example 7 | $(In_2O_3)40(CeO_2)60$ | $(In_2O_3)40(CeO_2)60$ | 6.6 | $5.7 \times 10^{-4}$ |
| Working example 8 | $(In_2O_3)20(CeO_2)80$ | $(In_2O_3)20(CeO_2)80$ | 7.4 | $1.5 \times 10^{-3}$ |
| Working example 9 | $(In_2O_3)90(CeO_2)10$ | $(In_2O_3)90(CeO_2)10$ | 5.8 | $2.4 \times 10^{-4}$ |
| Comparative example 1 | $In_2O_3$ | $In_2O_3$ | 6.3 | $3.0 \times 10^{-3}$ |
| Comparative example 2 | $(In_2O_3)20(Ga_2O_3)80$ | $(In_2O_3)20(Ga_2O_3)80$ | 7.8 | $3.0 \times 10^{-3}$ |

Figure 2:
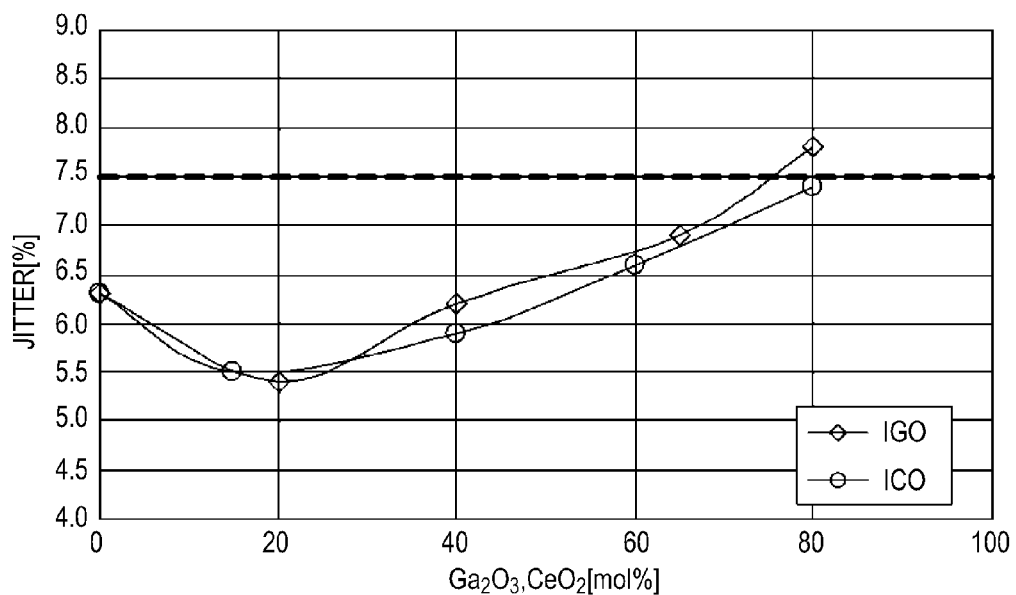
FIG. 2 is a graph showing jitter characteristics of recordable optical recording media in working examples 1 to 9 and comparative examples 1 and 2.
Figure 3:
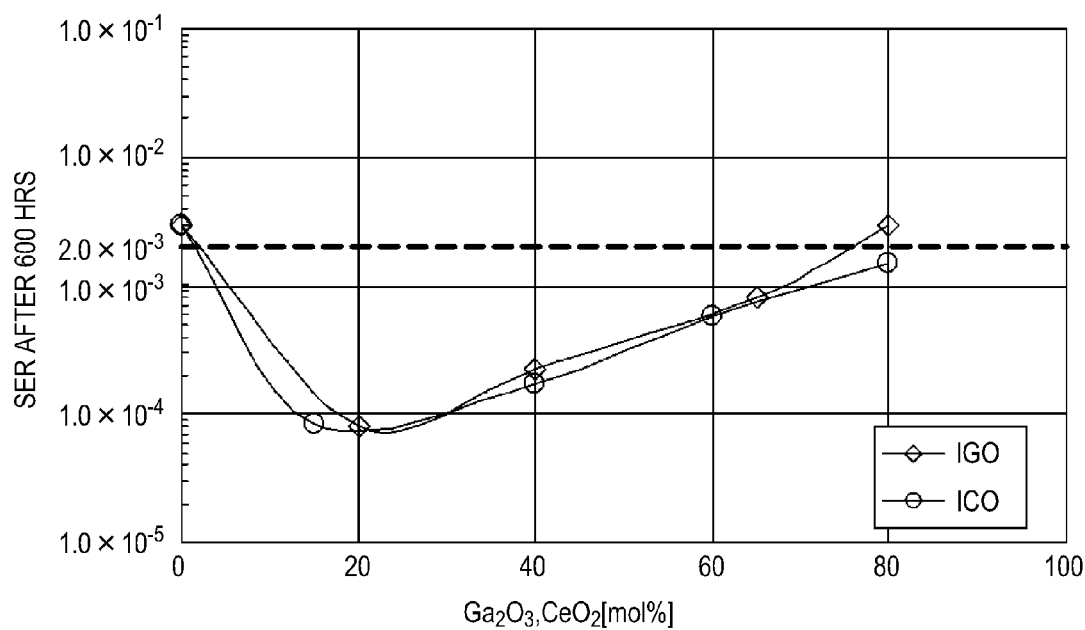
FIG. 3 is a graph showing storage reliability of the recordable optical recording media in working examples 1 to 9 and comparative examples 1 and 2.

FIG. 2 is a graph showing the jitter characteristics of the recordable optical recording media in working examples 1 to 9 and comparative examples 1 and 2. FIG. 3 is a graph showing the storage reliability characteristics of the recordable optical recording media in working examples 1 to 9 and comparative examples 1 and 2. As shown in FIGS. 2 and 3, the $(In_2O_3)_{1-x}(Ga_2O_3)_x$ material is denoted by IGO and the $(In_2O_3)_{1-x}(CeO_2)_x$ material is denoted by ICO.

From the above evaluation results, the following things are known.

It is known that the information signals and storage reliability characteristics change depending on additive amounts of $Ga_2O_3$ or $CeO_2$.

It is known that it is preferable to set the additive amount of $Ga_2O_3$ or $CeO_2$ in a range from 5 mol % to 75 mol % in order to satisfy the characteristics of jitter of 7.5% or less and SER of $2.0 \times 10^{-3}$ or less. Note that the jitter of 7.5% and SER of $2.0 \times 10^{-3}$ are the upper limit values obtained as characteristics of the recordable optical recording media as described above.

It is known that it is preferable to set the additive amount of $Ga_2O_3$ or $CeO_2$ in a range from 5 mol % to 65 mol % in order to satisfy the characteristics of jitter of 7.0% or less and SER of $1.0×10^{-3}$ or less.

It is known that it is preferable to set the additive amount of $Ga_2O_3$ or $CeO_2$ in a range from 15 mol % to 40 mol % in order to satisfy the characteristics of jitter of 7.0% or less and SER of $3.0×10^{-4}$ or less.

It is conceivable that the storage reliability is deteriorated when the additive amount of $Ga_2O_3$ or $CeO_2$ is less than 5 mol % because the $In_2O_3$ component becomes excessive and oxygen and water enter the recording film from the grain boundary of the $In_2O_3$ film. On the other hand, it is conceivable that good information signal characteristics become difficult to be obtained when the additive amount of $Ga_2O_3$ or $CeO_2$ exceeds 75 mol % because the characteristics of the additive material become strong in the protective film and good information signal characteristics obtained from $In_2O_3$ become difficult to be obtained.

<Studies on Productivity of First Protective Layer and Second Protective Layer>

For studies on productivity of the materials of the first protective layer and the second protective layer, direct-current (DC) sputtering availability and a degree of generation of nodules were observed. Whether DC sputtering is available or not depends on the conductivity of the target material of the protective layers. If the conductivity is good, DC sputtering is available, however, if the material has no conductivity, alternating-current (RF) sputtering is selected. That is, deposition can be performed by RF sputtering regardless of the conductivity of the material. However, generally, its sputtering rate is lower than that of the DC sputtering, and, when the film thickness of several tens of nanometers of the protective layer or the like is deposited, the layer is divided for plural cathodes for deposition. In this case, not only the cathodes are necessary in the number of divided layers but also the structure for the RF sputtering is complex and the facility becomes expensive, and there is a problem of deterioration of productivity that the cost significantly increases. Therefore, the DC sputtering is preferable in consideration of productivity. Further, the nodules are minute projections on the target surface, and considered as sputtering residues originating from high-resistance materials. As the nodules further progress, breakdown occurs around them and they become powdery and adhere to shields and discs. The parts of the disc to which the power has adhered cover the guide grooves for the reproduction laser, and a disc failure is determined as a servo failure. When the disc failure increases, it is necessary to stop the production and remove the nodules on the target surface and that causes lower capacity utilization, i.e., lower productivity, and thus, the target material with less nodules is preferable.

Test Example 1

A target of an indium oxide with a gallium oxide of 20 mol % added $((In_2O_3)_{80}(Ga_2O_3)_{20}$, hereinafter, referred to as $IGO_{20})$ was mounted on a DVD-Sprinter deposition apparatus manufactured by Oerlicon, the interior of its vacuum chamber was evacuated to $5×10^{-7}$ Torr, a mixed gas of an Ar gas of 30 sccm and an $O_2$ gas of 2 sccm was introduced into the vacuum chamber, and the film formation pressure was set to 0.5 mTorr. Then, the $IGO_{20}$ target was sputtered by direct-current (DC) sputtering of 2 kW. Note that Pinnacle plus manufactured by Advanced Energy is used for the DC power supply and the target of $\phi 200$ mm×thickness 6 mm was used. Deposition can be performed using the $IGO_{20}$ target, and a good sputtering rate of about 7 nm/s was obtained as is the case of ITO. Further, the generation status of nodules after the use of 30 kWh was confirmed. The area occupancy per square centimeters of nodules generated in non-erosion parts on the target after use of 30 kWh was referred to as the degree of generation of nodules, and the degree of 0.2 or less was determined as "Good" and the degree of more than 0.2 was determined "Poor". If the degree of generation of nodules is 0.2 or less, production was stably performed without the operation till the end of the target life. If the degree of generation of nodules is 0.7 or more, it is necessary to stop the production before the target life end and clean the surface, and the productivity is deteriorated. The degree of generation of nodules of the $IGO_{20}$ target was 0.1, and determined as "Good" as shown in Table 2. Therefore, DC sputtering was available and the nodule determination was also "Good", and the target material was known to be very good in productivity.

Test Example 2

A test was conducted in the same manner as that of test example 1 except that the target material is an indium oxide with a gallium oxide of 50 mol % added $((In_2O_3)_{50}(Ga_2O_3)_{50}$, hereinafter, referred to as $IGO_{50})$. As shown in Table 2, in the $IGO_{50}$ target, the DC sputtering was available and the degree of generation of nodules was 0.2, and a very good result was obtained.

Test Example 3

A test was conducted in the same manner as that of test example 1 except that the target material is an indium oxide with a cerium oxide of 15 mol % added $((In_2O_3)_{85}(CeO_2)_{15}$, hereinafter, referred to as $ICO_{15})$. As shown in Table 2, in the $ICO_{15}$ target, the DC sputtering was available and the degree of generation of nodules was 0.0, and a very good result was obtained.

Test Example 4

A test was conducted in the same manner as that of test example 1 except that the target material is an indium oxide with a cerium oxide of 50 mol % added $((In_2O_3)_{50}(CeO_2)_{50}$, hereinafter, referred to as $ICO_{50})$. As shown in Table 2, in the $ICO_{50}$ target, the DC sputtering was available and the degree of generation of nodules was 0.1, and a very good result was obtained.

Test Example 5

A test was conducted in the same manner as that of test example 1 except that the target material is an indium oxide with a tin oxide of 10 mol % added (ITO). As shown in Table 2, in the ITO target, the DC sputtering was available, however, the degree of generation of nodules was 0.5 and poor and the nodule determination was "Poor". In the case where the ITO target was used for production, several times of nodule removal operation were necessary during the target life and the capacity utilization was lower, that is, the productivity was poor by the operation.

Test Example 6

A test was conducted in the same manner as that of test example 1 except that the target material is an indium oxide with a gallium oxide of 10 mol % added $((In_2O_3)_{90}(Ga_2O_3)_{10}$, hereinafter, referred to as $IGO_{10})$. As shown in Table 2, in the IGO$_{10}$ target, the DC sputtering was available, however, the degree of generation of nodules was 0.5 and poor.

Test Example 7

A test was conducted in the same manner as that of test example 1 except that the target material is an indium oxide with a cerium oxide of 5 mol % added ((In$_2$O$_3$)$_{95}$(CeO$_2$)$_5$, ICO$_5$). As shown in Table 2, in the ICO$_5$ target, the DC sputtering was available, however, the degree of generation of nodules was 0.4 and poor.

Test Example 8

A test was conducted in the same manner as that of test example 1 except that the target material is an indium oxide (In$_2$O$_3$). As shown in Table 2, in the In$_2$O$_3$ target, the DC sputter was unavailable and the degree of generation of nodules was 0.8 and poor.

Test Example 9

A test was conducted in the same manner as that of test example 1 except that the target material is an gallium oxide (Ge$_2$O$_3$). As shown in Table 2, in the Ge$_2$O$_3$ target, the DC sputter was unavailable.

Test Example 10

A test was conducted in the same manner as that of test example 1 except that the target material is a cerium oxide (CeO$_2$). As shown in Table 2, in the CeO$_2$ target, the DC sputtering was unavailable.

Table 2 shows results of DC sputtering availability and nodule determinations of test examples 1 to 10.

TABLE 2

| | Protective layer material | Sputter power supply DC availability | Nodule determination | Productivity comprehensive evaluation |
|---|---|---|---|---|
| Test example 1 | (In$_2$O$_3$)80(Ga$_2$O$_3$)20 | Good | Good | Good |
| Test example 2 | (In$_2$O$_3$)50(Ga$_2$O$_3$)50 | Good | Good | Good |
| Test example 3 | (In$_2$O$_3$)85(CeO$_2$)15 | Good | Good | Good |
| Test example 4 | (In$_2$O$_3$)50(CeO$_2$)50 | Good | Good | Good |
| Test example 5 | ITO | Good | Poor | Poor |
| Test example 6 | (In$_2$O$_3$)90(Ga$_2$O$_3$)10 | Good | Poor | Poor |
| Test example 7 | (In$_2$O$_3$)95(CeO$_2$)5 | Good | Poor | Poor |
| Test example 8 | In$_2$O$_3$ | Poor | Poor | Poor |
| Test example 9 | Ga$_2$O$_3$ | Poor | Good | Poor |
| Test example 10 | CeO$_2$ | Poor | Good | Poor |

From the test examples 1 to 10, in the ITO target and the IGO targets and ICO targets with less additive amounts of gallium oxides and cerium oxides, nodules tend to be generated. On the other hand, in the indium oxide, the gallium oxide, and the cerium oxide as single oxides not composite oxides, the DC sputtering tends to be unavailable, the sputtering rate tends to be lower, and the productivity tends to be deteriorated. Therefore, the composite oxides are preferable for the material of the first protective layer and the second protective layer, and it is preferable that the additive amounts of gallium oxides and cerium oxides are 15 mol % or more. Further, if the additive amounts of gallium oxides and cerium oxides are too much larger, the sputtering rate becomes lower, and thus, it is preferable that the additive amounts are reduced to the degree at which the nodules are hard to be generated. In consideration thereof, it is preferable that the additive amounts of gallium oxides and cerium oxides are 75 mol $ or less.

As a summary of the above evaluation results, in view of the information signal characteristics and storage reliability characteristics, the contents of gallium oxides and cerium oxides are preferably from 5 mol % to 75 mol %, more preferably from 5 mol % to 65 mol %, and further preferably from 15 mol % to 40 mol %. This is expressed by the composition formula $[(In_2O_3)_{1-X}(A)_X]$ (A is cerium oxide or gallium oxide, X is preferably $0.05 \leq X \leq 0.75$, more preferably $0.05 \leq X \leq 0.65$, and further preferably $0.15 \leq X \leq 0.40$).

In view of the productivity of nodule resistance or the like, the content of gallium oxide or cerium oxide is preferably from 15 mol % to 75 mol %. This is expressed by the composition formula $[(In_2O_3)_{1-X}(A)_X]$ (A is cerium oxide or gallium oxide, X is preferably $0.15 \leq X \leq 0.75$).

In view of the information signal characteristics, the storage reliability characteristics, and the productivity of nodule resistance or the like, the content is preferably from 15 mol % to 75 mol %, more preferably from 15 mol % to 65 mol %, further preferably from 15 mol % to 40 mol %. This is expressed by the composition formula $[(In_2O_3)_{1-X}(A)_X]$ (A is cerium oxide or gallium oxide, X is preferably $0.15 \leq X \leq 0.75$, more preferably $0.15 \leq X \leq 0.65$, and further preferably $0.15 \leq X \leq 0.40$).

Thus far, the embodiment of the invention has specifically been explained, however, the invention is not limited to the above described embodiment and various changes may be made based on the technical idea of the invention.

For example, the numerical values, the materials, the structures, the shapes, and so on cited in the above described embodiment are just examples and different numerical values, materials, structures, shapes, and so on may be used according to need.

Further, the respective configurations of the above described embodiment and working examples may be combined with one another without departing from the scope of the invention.

Furthermore, in the above described embodiment and working examples, the examples of application of the invention to the recordable optical recording medium having the single inorganic recording film have been explained, however, the invention may be applied to a recordable optical recording medium having two or more inorganic recording films.

In addition, in the above described embodiment and working examples, the examples of application of the invention to the recordable optical recording medium having the light transmission layer on the inorganic recording film, on which recording or reproduction of information signals is performed by applying a laser beam from the light transmission layer side to the inorganic recording film have been explained, however, the invention is not limited to the examples. For example, the invention may be applied to a recordable optical recording medium having an inorganic recording film on a substrate, on which recording or reproduction of information signals is performed by applying a laser beam from the substrate side to the inorganic recording film, or a recordable optical recording medium having two substrates bonded together, on which recording or reproduction of information signals is performed by applying a laser beam from one substrate side to the inorganic recording film between the substrates.

Further, in the above described embodiment and working examples, the case of forming the respective layers of the recordable optical recording medium by the sputtering method has been explained as examples, however, not limited to those, but other deposition methods may be used. As the deposition methods, for example, CVD methods (Chemical Vapor Deposition: a technology of precipitating a thin film from a vapor phase using chemical reaction) such as thermal CVD, plasma CVD, and photo CVD, and PVD methods (Physical Vapor Deposition: a technology of agglomerating a material physically vaporized in vacuum on a substrate to form a thin film), or the like may be used.

Furthermore, in the above described embodiment and working examples, the examples of application of the invention to the recordable optical recording medium have been explained, however, the invention may be applied to a rewritable optical recording medium. Note that the effect of the improvement in reliability is greater in the case where the invention is applied to the recordable optical recording medium.

In addition, in the above described embodiment and working examples, the examples of application of the invention to the recordable optical recording medium having the protective layers on both sides of the inorganic recording layer have been explained, however, the invention may be applied to a recordable optical recording medium having a protective layer on one side of the inorganic recording film. That is, the protective layer including an indium oxide and a cerium oxide or an indium oxide and a gallium oxide may be provided on one side of the inorganic recording film.

The present application contains subject matter related to that disclosed in Japanese Priority Patent Application JP 2010-124937 filed in the Japan Patent Office on May 31, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:
   an inorganic recording layer; and
   a protective layer including a composite oxide containing an indium oxide on at least one surface of the inorganic recording layer,
   wherein,
   the composite oxide is represented by the formula $(In_2O_3)_{1-X}(A)_X$, and
   where A is cerium oxide or gallium oxide and X satisfies a range of $0.15 \leq X \leq 0.75$.

2. The optical recording medium according to claim 1, further comprising:
   a heat accumulation layer between the inorganic recording layer and the protective layer,
   wherein,
   a recording and/or reproduction laser beam is applied from a side of the heat accumulation layer or a side opposite to the heat accumulation layer toward the inorganic recording layer.

3. The optical recording medium according to claim 2, wherein the heat accumulation layer includes ZnS and $SiO_2$.

4. The optical recording medium according to claim 1, wherein the protective layer is provided on both sides of the inorganic recording layer.

5. The optical recording medium according to claim 1, wherein the inorganic recording layer includes ZnS, $SiO_2$, and Sb.

6. A manufacturing method of an optical recording medium comprising the steps of:
   providing an inorganic recording layer; and
   providing a protective layer including a composite oxide containing an indium oxide on at least one surface of the inorganic recording layer,
   wherein,
   the composite oxide is represented by the formula $(In_2O_3)_{1-X}(A)_X$ and,
   where A is cerium oxide or gallium oxide and X satisfies a range of $0.15 \leq X \leq 0.75$.

7. The manufacturing method of an optical recording medium according to claim 6, wherein, the protective layer is formed by a direct-current sputtering method.

\* \* \* \* \*